(12) United States Patent
Nelan

(10) Patent No.: US 9,401,030 B2
(45) Date of Patent: Jul. 26, 2016

(54) IMAGE PROCESSING SYSTEM FOR SOIL CHARACTERIZATION

(71) Applicant: Tazco Soil Service Co., Goodfield, IL (US)

(72) Inventor: Austin Lee Nelan, Peoria, IL (US)

(73) Assignee: Tazco Soil Service Co., Goodfield, IL (US)

( * ) Notice: Subject to any disclaimer, the term of this patent is extended or adjusted under 35 U.S.C. 154(b) by 16 days.

(21) Appl. No.: 14/551,997

(22) Filed: Nov. 24, 2014

(65) Prior Publication Data

US 2015/0310633 A1    Oct. 29, 2015

Related U.S. Application Data

(60) Provisional application No. 61/984,477, filed on Apr. 25, 2014.

(51) Int. Cl.
*G06T 7/40* (2006.01)
*G06T 7/00* (2006.01)
*G06K 9/00* (2006.01)

(52) U.S. Cl.
CPC ............ *G06T 7/408* (2013.01); *G06K 9/00657* (2013.01); *G06T 7/0002* (2013.01); *G06T 2207/10024* (2013.01); *G06T 2207/10036* (2013.01); *G06T 2207/10048* (2013.01); *G06T 2207/30188* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,999,650 A * | 12/1999 | Ligon | ................... | G06T 11/001 382/110 |
| 6,178,253 B1 * | 1/2001 | Hendrickson | ......... | G01J 3/2803 348/144 |
| 6,266,432 B1 * | 7/2001 | Wiens | .................... | G06Q 99/00 111/903 |
| 7,058,197 B1 * | 6/2006 | McGuire | ............ | G06K 9/00657 382/100 |
| 7,068,816 B1 * | 6/2006 | Knoblauch | .......... | A01B 79/005 348/144 |
| 8,737,694 B2 * | 5/2014 | Bredehoft | .......... | G06K 9/00657 382/103 |
| 2001/0048755 A1 * | 12/2001 | Wiens | .................... | G06Q 99/00 382/113 |
| 2012/0101784 A1 | 4/2012 | Lindores et al. | | |
| 2012/0155714 A1 | 6/2012 | Douglass et al. | | |
| 2012/0237083 A1 * | 9/2012 | Lange | ................ | G06K 9/00805 382/103 |
| 2014/0122488 A1 * | 5/2014 | Jung | ...................... | A01K 11/00 707/737 |

FOREIGN PATENT DOCUMENTS

CN    102831310 A    12/2012
EP    1411758 B1    7/2002

OTHER PUBLICATIONS

CN 102831310, English abstract, Dec. 19, 2012, 1 page.

(Continued)

*Primary Examiner* — Anand Bhatnagar
(74) *Attorney, Agent, or Firm* — Brinks Gilson & Lione

(57) ABSTRACT

A system processes images of soil using image processing techniques that help to reveal soil characteristics and differences between soil characteristics. The characteristics may be indicative of soil type, and the differences between soil characteristics help to identify where soil types change in a field. The system may determine management zones for a field based on the soil characteristics, e.g., by identifying multiple regions within a field, each management zone corresponding to similar soil characteristics. The system may communicate the management zones to devices in the field, to land appraisers, or to customers who use the results to manage the soil, as just a few examples.

20 Claims, 14 Drawing Sheets

(56) References Cited

OTHER PUBLICATIONS

Baret, F., et al., Tsavi: A Vegetation Index Which Minimizes Soil Brightness Effects on LAI and APAR Estimation, $12^{th}$ Canadian Symposium on Remote Sensing and IGARSS '90, Vancouver, Canada, Jul. 10-14, 1989, 5 pages.

Baret, F., et al., Potentials and Limits of Vegetation Indices for LAI and APAR Assessment, Remote Sensing of Environment 35:161-173, Nov. 12, 1990, 13 pages Birth, Gerald S., et al., Measuring the Color of Growing Turf with a Reflectance Spectrophotometer, Argronomy Journal, vol. 60, Nov.-Dec. 1968, 10 pages.

Buschmann, C., et al., In vivo spectroscopy and internal optics of leaves as basis for remote sensing of vegetation, Remote Sensing of Environment, vol., 14, No. 4, 1993, 13 pages.

Crippen, Robert E., Calculating the Vegetation Index Faster, Remote Sensing of Environment, vol. 34, 1990, 3 pages.

Gitelson, Anatoly A., et al., Novel algorithms for remote estimation of vegetation fraction, Remote Sensing of Environment, vol. 80, 2002, 13 pages.

Gitelson, Anatoly A., et al., Use of a Green Channel in Remote Sensing of Global Vegetation from EOS-MODIS, Remote Sensing of Environment, vol. 58, 1996, 10 pages.

Huete, A.R., A Soil-Adjusted Vegetation Index (SAVI), Remote Sensing of Environment, vol. 25, 1988, 15 pages.

Liu, Hui Qing, et al., A Feedback Based Modification of the NDVI to Minimize Canopy Background and Atmospheric Noise, IEEE Transactions on Geoscience and Remote Sensing, vol. 33, 1995, 9 pages.

Pinty, B., et al., Gemi: A non-linear index to monitor global vegetation from satellites, Vegetatio 101, 1992, 6 pages.

Qi, J., et al., A Modified Soil Adjusted Vegetation Index, Remote Sensing of Environment, vol. 48, 1994, 8 pages.

Richardson, A.J., et al., Distinguishing Vegetation from Soil Background Information, Photogrammetric Engineering and Remote Sensing, vol. 43, 1977, 13 pages.

Rondeaux, Genevieve, et al., Optimization of Soil-Adjusted Vegetation Indices, Remote Sensing of Environment, vol. 55, 1996, 13 pages.

Rouse, Jr., J. W., et al., Monitoring Vegetation Systems in the Great Plains with ERTS, Third ERTS Symposium, NASA SP-351, 1973, 11 pages.

Sripada, Ravi P., et al., Aerial Color Infrared Photography for Determining Early In-Season Nitrogen Requirements in Corn, Argronomy Journal, vol. 98, 2006, 10 pages.

Tucker, Compton J., Red and Photographic Infrared Linear Combinations for Monitoring Vegetation, Remote Sensing of Environment, vol. 8, 1979, 24 pages.

\* cited by examiner

300

Specifications:

4072 x 4072 pixels
16 M pixels
14-bit resolution
GPS coordinates in EXIF file
Metric-calibrated 50mm lens
RAW recorded image format
>2000 image capacity
+12VDC operation
Mount for aircraft interface Capability with 50mm lens from 2,500 feet flight altitude at 100kt ground speed:

Cross-track Field of View: 40 degrees
Ground Sample Distance (pixel resolution): 14cm (5.5 inch)
Area per image: 0.32 sqkm (78 acres)
Image interval for 70% forward overlap: 3 seconds Geo-rectification / Mosaic Processing System:

Image processing computer with two Graphic Processing Units (GPU)
Capability to geo-rectify hundreds of images using only GPS information
Capability to seamlessly mosaic hundreds of images using only GPS information

Figure 3

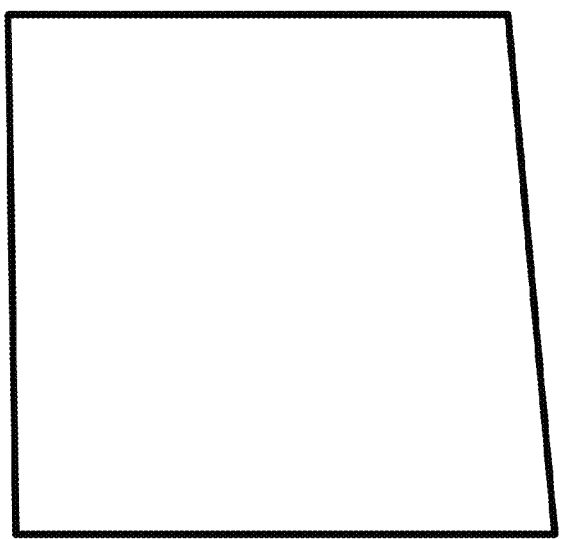
Figure 6

IMAGE PROCESSING SYSTEM FOR SOIL CHARACTERIZATION

PRIORITY CLAIM

This application claims priority to U.S. Provisional Application Ser. No. 61/984,477, filed 25 Apr. 2014, which is entirely incorporated by reference.

TECHNICAL FIELD

This disclosure relates to image processing. This disclosure also relates to image processing of ground images to determine soil characteristics.

BACKGROUND

The application of image processing technology to biology has given rise to the Normalized Difference Vegetative Index (NDVI). The NDVI is a commonly used metric for identifying plant growth within an image and relies on plant chlorophyll strongly absorbing visible red wavelengths, while reflecting green wavelengths. The NDVI metric is sometimes formulated as:

$$NDVI = \frac{r_{NIR} - r_{VIS}}{r_{NIR} + r_{VIS}}$$

where $r_{VIS}$ and $r_{NIR}$ are the spectral reflectance measurements acquired in the red visible and near-infrared regions, respectively.

The NDVI can be a useful tool for crop growers, e.g., it can help to determine when and how much fertilizer to apply. However, the application of the NDVI equation and other variants has been specific to vegetation. Further developments in image processing techniques will further assist crop growers and other individuals and organizations involved with land management and valuation.

BRIEF DESCRIPTION OF THE DRAWINGS

FIG. 3 shows aerial camera characteristics.

FIG. 6 shows a field boundary clipping window.

DETAILED DESCRIPTION

Figure 1:
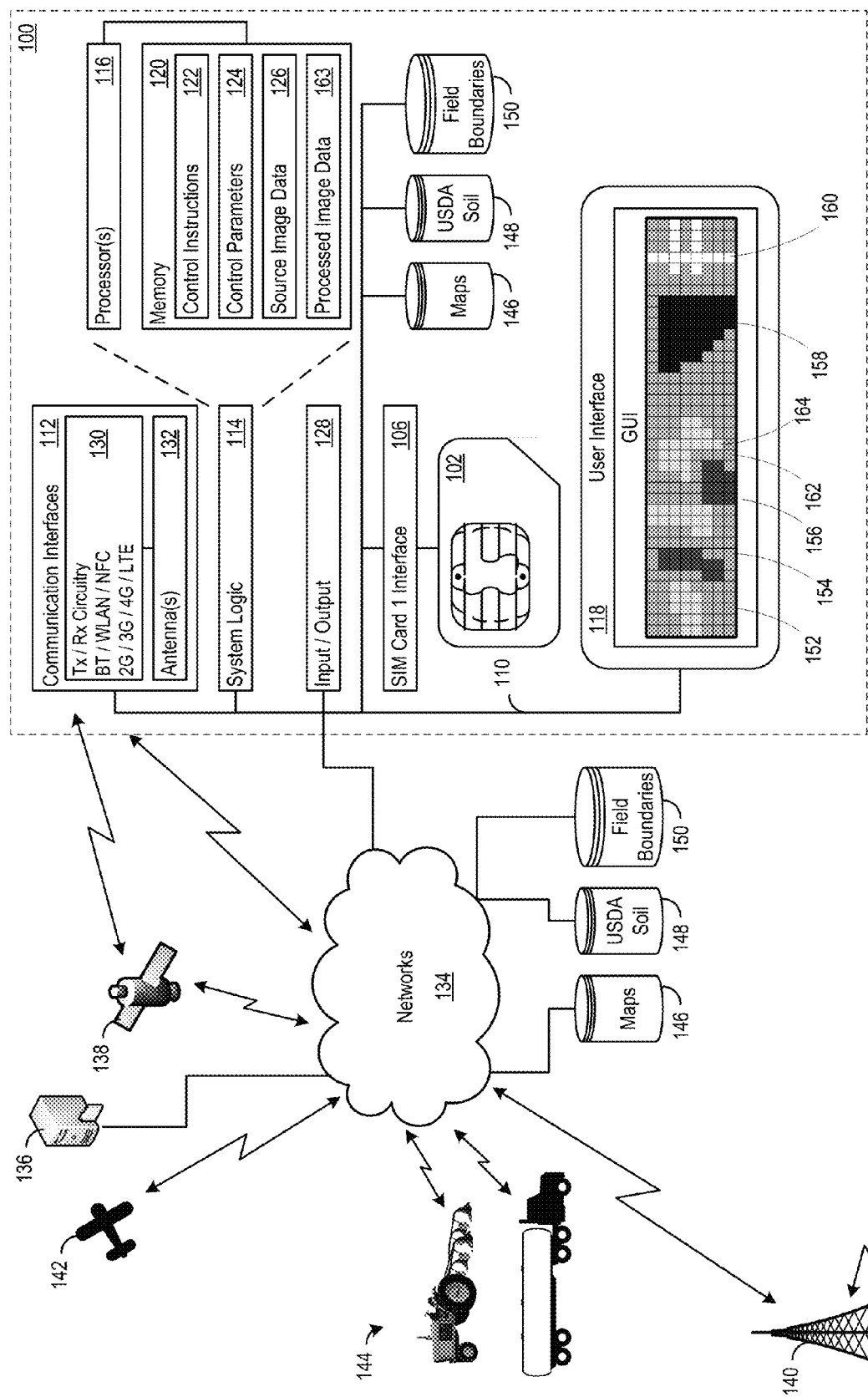
FIG. 1 shows an example of a system that performs image processing to determine soil characteristics.

FIG. 1 shows an example of a system 100. The system 100 may be implemented in a desktop computer (running, e.g., a Microsoft™ Windows™ operating system), laptop computer, tablet computer, or smartphone, as just a few examples. The techniques described below regarding image processing to determine soil characteristics may be implemented in a wide array of different types of devices. Accordingly, the system example described below provides just one example context for explaining the image processing techniques.

The system 100 includes communication interfaces 112, system logic 114, and a user interface 118. The system logic 114 may include any combination of hardware, software, firmware, or other circuitry. The system logic 114 may be implemented, for example, with one or more systems on a chip (SoC), application specific integrated circuits (ASIC), discrete analog and digital circuits, and other circuitry.

The system logic 114 is part of the implementation of any desired functionality in the system 100, such as image processing for determining soil characteristics, e.g., soil type, reflectivity, or other characteristics. The system logic 114 may: run applications; accepting user inputs; save and retrieve application data; establish, maintain, and terminating cellular phone calls or data connections for, as one example, Internet connectivity; establish, maintain, and terminate wireless network connections, Bluetooth connections, or other connections; and display information on the user interface 118, such as processed images that include soil type indicators.

The user interface 118 and the input/output interfaces 128 may include a graphical user interface (GUI), touch sensitive display, voice or facial recognition inputs, buttons, switches, speakers and other user interface elements. Additional examples of the inputs 128 include microphones, video and still image cameras, headset and microphone input/output jacks, Universal Serial Bus (USB) connectors, memory card slots, and other types of inputs. The input/output interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other circuitry for transmitting and receiving through one or more antennas, or (for some devices) through a physical (e.g., wireline) medium such as coaxial cable, Ethernet cable, or a telephone line. In the example of FIG. 1, the system 100 supports one or more Subscriber Identity Modules (SIMs), such as the SIM1 102 to further support data communications over cellular networks. An electrical and physical interface 106 connects SIM1 102 to the rest of the user equipment hardware, for example, through the system bus 110.

The system 100 may be in communication with other devices. For instance, the system 100 may receive image data through the networks 134 (including, e.g., Internet connections) from many different sources, and may transmit processed image data, soil characteristics, or any other data through the networks 134 to many different destinations. Examples of sources and destinations include local and remote file servers 136; communication and imaging satellites 138; devices in the field (e.g., sensing or imaging devices) that can communicate, e.g., over a wireless connection, such as through the cellular base station 140; airplanes, drones, and helicopters 142; and field equipment 144, such as trucks, tractors, combines, seed planters, liquid applicators, dry spreaders, and sprayers. The system 100 may also obtain and deliver data in other ways, e.g., via CDROM, flash memory drives, disks, and other media.

The system 100 may access databases either locally or remotely (e.g., over the networks 134). The databases may include, as examples, map databases 146, including digital globe imagery; USDA soil type databases 148, that specify soil types based on past or present USDA soil sampling; and field boundary databases 150, that define geographical boundaries around specific regions of interest, such as specific fields.

The system logic 114 may include one or more processors 116 and memories 120. The memory 120 stores, for example, control instructions 122 that the processor 116 executes to carry out desired functionality for the system 100, such as processing source image data 126 to generate processed image data 163. The control parameters 124 provide and specify configuration and operating options for the control instructions 122. The control parameters 124 may, e.g., specify pixel processing equations, the values of parameters in the equation, a mapping of processed pixel values to soil characteristics (e.g., to soil types such as sable, catlin, ipava, tama, or other soils), the pixel value thresholds for distinguishing among soil characteristics, and other parameters.

In one implementation, the control instructions 122 include one or more application software packages with custom extensions. For instance, the processor 116 may execute image processing software such as Agisoft Photoscan software for building textured 3D models using digital photos. In particular, the image processing software may take the digital images that are captured with geo-tags, and mosaic those photos together to create a geo-referenced image, e.g., a .tif image as a base image to work from for soil analysis.

Figure 4:
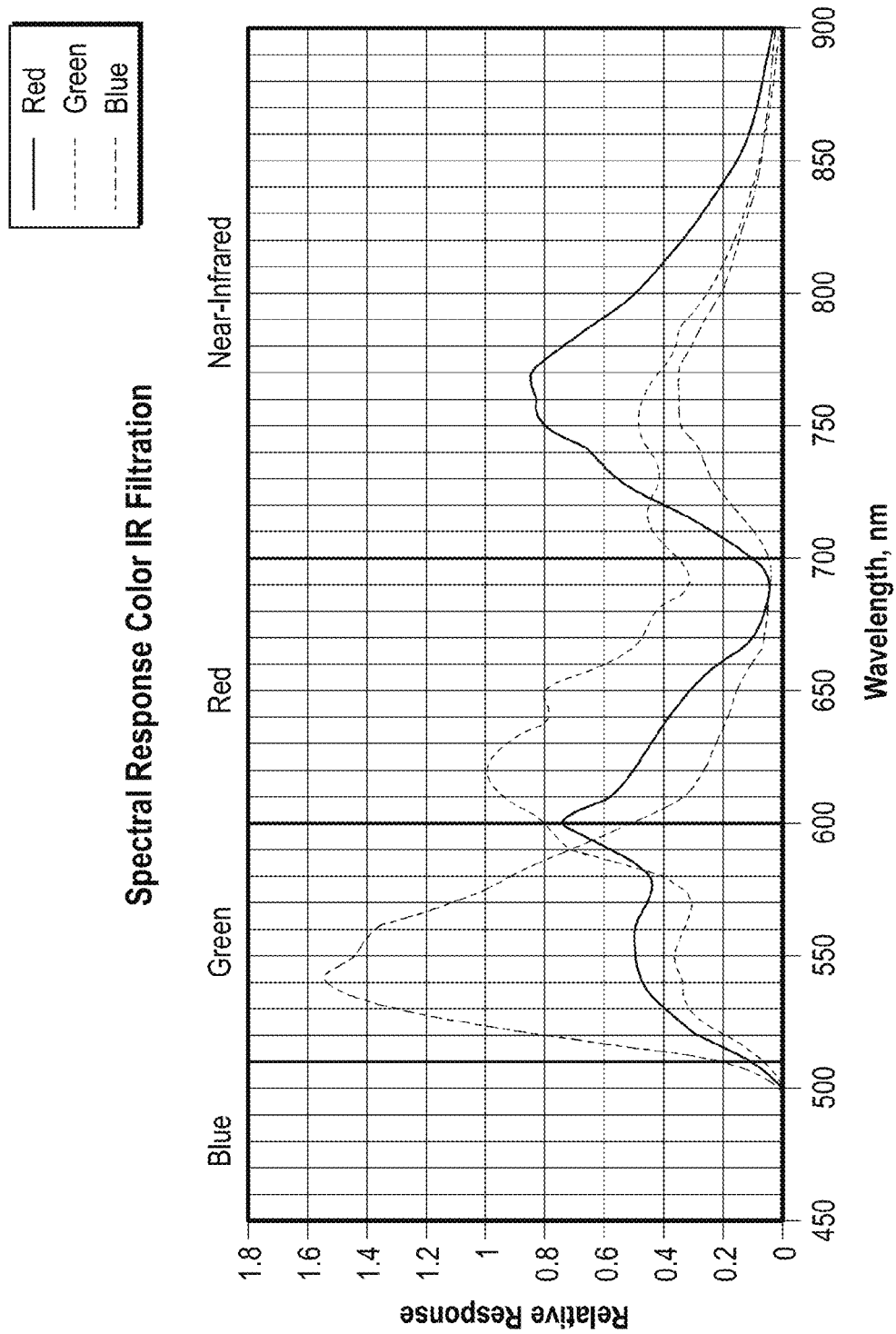
FIG. 4 shows camera spectral response.

In that regard, the individual digital images may be obtained by images taken from an aerial camera. In one implementation, the aerial camera is mounted to a helicopter, drone, or airplane. Example specifications and spectral response for the camera are shown in FIGS. 3 and 4. The camera may be designed to achieve any desired resolution. In the implementation of FIG. 3, the camera captures 80 acres per image at 6 inch by 6 inch resolution when flown at 5,000 feet. Higher or lower resolutions may be implemented. The camera film may be, for instance, Kodak Aerochrome III Film 1443. However, other films with varying infrared-sensitivity, false-color reversal, resolving power, grain, and other characteristics may also be used.

The control instructions 122 may further include other applications, e.g., ArcMap and ArcCatalog which are available from Esri of Redlands Calif. as part of the ArcGIS suite of geospatial processing programs. In some implementations, the soil image processing techniques are implemented in the Map Algebra tool within ArcMap as custom processing logic. However, the soil image processing techniques may be implemented in hardware, software, or both, in many other ways, e.g., with a stand-alone image processing application.

FIG. 1 shows an example soil processing image 152 on the GUI resulting from processing a raster clipped image of a larger geographic area. The soil processed image 152 shows the clipped area via a rectangular field boundary 154. After soil processing (described below), the image reveals areas indicative of difference in soil characteristics across the field, but in certain situations may also indicate specific soil characteristics. For instance, the regions 156 and 158 may indicate a specific type of soil (e.g., loam) or a specific reflectivity in the green, red, or near infrared spectrum, while the region 160 may indicate drainage currently installed in the field or present in the past. As another example, the regions may represent transitions in soil type. In FIG. 1, for instance, moving from region 156 to region 162 to region 164, the relative properties of the soil in each region change, as shown by the difference in image processing output.

Note that the system 100 may find particular application to agricultural environments. For instance, the ground images that the system 100 analyzes may be agricultural in nature, including images of farm fields, as one example. The system 100 facilitates a more accurate, efficient, and specific approach to the agriculture occurring on these fields, in part by determining soil characteristics or changes in characteristics, and providing management feedback based on the soil characteristics. In that regard, the system 100 accurately and consistently maps organic material, cation-exchange capacity, and pH levels in the ground. The processing techniques that generate the output are described in detail below.

Figure 2:
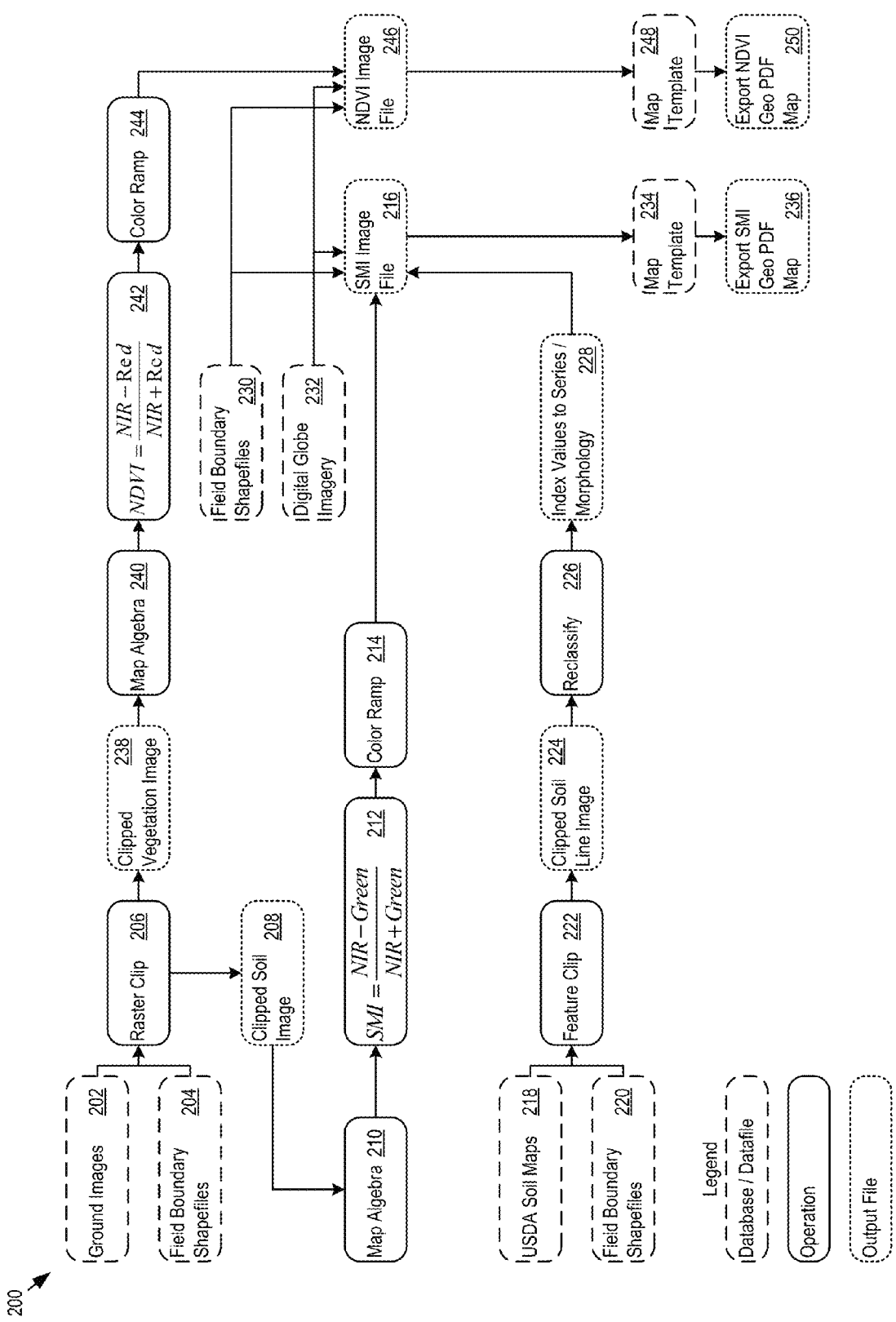
FIG. 2 shows a flow diagram of image processing that determines soil characteristics.

FIG. 2 shows a flow diagram of image processing logic 200 that determines soil characteristics. The logic 200 provides ground images (202), e.g., taken from the aerial camera and optionally stitched together and geo-referenced to provide a larger composite image over any desired extend of ground. An image chunk may span, e.g., 10 to 200 square miles, and the chunk may contain any number of fields (e.g., crop producing fields) of any shape.

The images are preferably soil images. In that respect, the images may be taken at times of the season when vegetation is less prevalent or absent. For instance, the images may be taken during the fallow period of a field when crop is not growing. Although there may still be some vegetation in the image, such as naturally occurring weed species and residue from prior crops, the soil images capture significant soil content. Accordingly, the image processing techniques principally analyze the soil captured in the images to determine soil characteristics. Note also that vegetation, if any, tends to appear in the red spectrum rather than the green spectrum. The SMI equation shown below is one example of a soil processing equation that the system 100 may apply to determine soil characteristics using the green and near infrared image components, and thereby act as a filter against vegetation that may be present in the image.

In other implementations, the system 100 processes images that have less than a pre-defined threshold percentage of vegetation coverage. For instance, the pixels corresponding to vegetation may be less than 10% of the pixels in the image. As another example, the system 100 may obtain an input (e.g., a selection window) that selects or specifies sections of soil for processing, from within an image that may have vegetation coverage. As another possibility, the system 100 may process images regardless of vegetation coverage, and the operator reviewing the image processing results may determine by inspection which areas of the image are primarily soil.

The examples above illustrate that the system 100 may process images obtained when a field is expected to have one or more specified characteristics. Additional characteristics include how level the field is, and times when more soil is expected to be showing. For instance, the system 100 may process images taken within a threshold amount of time (e.g., between 8 hours to 2 days) after a rain (which tends to level the field), after leveling the field with an implement, or after a tillage pass that levels the field and turns up the soil. Another characteristic is crop type. For instance, the system 100 may preferably process images obtained from fields coming out of beans, rather than fields coming out of corn, due to the lesser degree of vegetation stubble or residue left by beans. Regardless of the particular characteristics, however, the system 100 may analyze the image data, determine soil characteristics and differences in characteristics, and take responsive actions, such as building management zones and communicating the zones to other entities, including field equipment.

The logic 200 may consult the field boundary shapefiles (204) to add field boundaries to the image chunks. The shapefiles may define geo-referenced boundaries that show, e.g., the shape of the fields or other geographic units within the image chunks. The shapefiles may include or exclude roads or waterways, for instance, or any other portion of a field no longer in production.

The logic 200 then performs a raster clip (206) to, e.g., generate an image file that includes the specific field of interest and removes the image data outside of the field of interest. The images taken when vegetation is less prevalent (e.g., prior to planting or before plants have substantially emerged from the soil) may show primarily soil, thereby resulting in a clipped soil image (208). Images taken when vegetation is prevalent (e.g., knee high soybeans or corn, or when tassels emerge on the crops) however may result in a clipped vegetation image (238).

The logic 200 then applies map algebra (210) (e.g., within ArcMap) to process the clipped soil image 208. In particular, the map algebra may apply the following soil processing (212) to the pixels of the image to produce Soil Modified Index (SMI) data:

$$SMI = \frac{NIR - Green}{NIR + Green}$$

where NIR and Green are the spectral reflectance measurements acquired in the near-infrared and green (visible) regions, respectively. The soil processing (212) produces soil data (visualized, e.g., in soil images) that are highly indicative of soil characteristics. Examples of characteristics include soil type (e.g., clay, loam, or silty clay), reflectivity, and other characteristics, such as percentage of sand, silt, or clay, or any combination thereof. Variations of the SMI equation may be used as well, such as by varying the relative proportion of Green or NIR used in the numerator or denominator. Note also that the equation facilitates finding differences between soil types. That is, the equation highlights the differences between different soils in an image, even when any particular specific characteristic is not revealed by the equation. The results of the image processing may therefore also serve as a guide for locating where in the geography a soil changes or becomes different from other soils in the geography. An individual may then visit those specific areas and collect samples for specific analysis and determination of any desired soil characteristic.

The logic 200 may further apply a color ramp (214) to enhance the soil data. For instance, the color ramp (214) may be a two color ramp that runs from green to red. The color ramp may be a color ramp composed of multiple individual color ramps. The color ramp (214) adds color changes to the image to highlight the characteristics of the soil identified by the soil processing (212). That is, the color ramp (214) provides a mapping from the results of the soil processing (212) (in which, e.g., the values from each pixel may range from +1 to −1) to a color image. In other implementations, the mapping may be a greyscale mapping, or a black and white mapping with a specific threshold set to select between a black pixel or a white pixel.

The logic 200 may place the soil processed image into perspective on digital globe imagery (232) and add field boundaries from a field boundary shapefile (230). The result image may be referred to as an SMI image file (216). The SMI image file may be saved as part of a map template (234) and exported (e.g., to customers) as a geo-tagged PDF SMI map (236). The SMI map (236) thereby shows (and optionally highlights in color) soil characteristics of specific areas of geography, such as crop producing fields. The SMI map (236) may include a scale that maps, e.g., color, to reflectivity or other soil characteristic.

The SMI processing also helps to identify where drainage (e.g., clay tile) has been installed. In many cases, the records of the drainage have been lost or are incomplete or inaccurate. The SMI processing shows modified soil type along lines corresponding to the drainage paths (effectively man-made soil resulting from the drainage), as well as identifying lines corresponding to the drainage lines themselves.

The logic 200 may also add USDA soil map lines to an image. To that end, the logic 200 may obtain topographic soil data from USDA soil map databases (218). In connection with the field boundary shapefiles (220) which help outline the region of interest in the image, the logic 200 may clip (222) the topographic soil lines to keep those that are present in the region of interest, thereby obtaining a clipped soil line image (224) with topographically displayed USDA soil lines.

The USDA soil maps may include soil type indicators, e.g., 48A corresponding to sable loam, at various points in the map that were manually measured in the past by government employees. The logic 200 may reclassify (226) the soil type indicators, by mapping or indexing the soil type indicators to a textual description corresponding to the soil type, or otherwise providing information about what the soil type indicator or other USDA data means, and optionally providing morphology data concerning the soil lines and the geographical region of interest (228). The logic 200 may add the USDA soil lines as an individual layer to the SMI image file (216), or may add the USDA soil lines to an existing layer in the SMI image file (216), as examples.

As a result, the logic 200 may provide soil characteristic images both with and without USDA soil lines. When the USDA soil lines are included, the SMI processing helps to show how the soil characteristics actually correspond to the USDA soil lines. That is, the SMI processing provides a helpful indicator as to what extent the USDA soil lines are accurate, and provide insight into where the soil characteristics may differ compared to the old USDA soil map data.

The logic 200 may also perform NDVI processing. In that respect, the logic 200 may process the clipped vegetation image (238) to produce an NDVI image file (246). More specifically, the logic 200 may apply map algebra (240) (e.g., within ArcMap) to process the clipped vegetation image (238). In particular, the map algebra may apply the following vegetation processing (242) to the pixels of the image to produce the NDVI output:

$$NDVI = \frac{NIR - Red}{NIR + Red}$$

where NIR and Red are the spectral reflectance measurements acquired in the near-infrared and red (visible) regions, respectively. The vegetation processing (242) produces image results that are highly indicative of vegetation characteristics.

The logic 200 may further apply a color ramp (244). The color ramp (244) adds color changes to the vegetation processed data to highlight the characteristics of the vegetation. That is, the color ramp (244) provides a mapping from the results of the vegetation processing (242) (in which, e.g., the values from each pixel may range from +1 to −1) to a color image. In other implementations, the mapping may be a greyscale mapping, or a black and white mapping with a specific threshold set to select between a black pixel or a white pixel.

The logic 200 may place the vegetation processed image into perspective on digital globe imagery (232) and add field boundaries from a field boundary shapefile (230). The result image may be referred to as an NDVI image file (246). The NDVI image file may be saved as part of a map template database (248) and exported (e.g., to customers) as a geo-tagged PDF NDVI map (250). The NDVI map (250) thereby shows (and optionally highlights in color) vegetation characteristics of specific areas of geography, such as crop producing fields. The NDVI map (250) may include a scale that maps, e.g., color, to vegetation characteristic. Given the resolution achieved by the camera (e.g., 6 inches by 6 inches), the NDVI processing may reveal very fine vegetation detail. The detail may permit visualization of even individual rows of crops, and how they are performing compared to other (e.g., neighboring) rows of crops in the field.

Returning to FIG. 1, the system 100 may communicate soil and vegetation processed images to many different entities for many different reasons. For instance, the images may help identify management zones in the field of interest. As a result, the system 100 or the customer may identify areas of the fields that are alike, and once those areas of the field are identified that have a similar soil type, the land manager may then soil sample according to those similar areas. Whereas, in the past, a land manager had to rely on basic grid sampling. The soil processing help to show where the soil variability that exists, and for which the USDA soil maps were inaccurate or incomplete. The soil processing helps to identify where areas of similarity exist, facilitating direct sampling of those areas.

Furthermore, given the increased accuracy of the soil processing (compared to, e.g., the old USDA soil maps) and the tests of the identified soil characteristics, the land manager may implement a management plan tailored to the different soil characteristics. For instance, based on the soil processing and the tests, the land manager may apply amendments to the soil, such as adding lime, gypsum, fertilizer, nitrogen, phosphorous, potassium, sulfur, zinc, boron or other amendments. The land manager may use the soil processed images to create a custom prescription and using variable rate technology that may drive, e.g., an applicator through the field and change the rate or change the product delivered to the soil dynamically. The system 100 may communicate such changes to the applicator or other device or vehicle through the communication interfaces 112, for instance.

The land manager may also vary specific parameters to increase the productivity of soils, based on the soil processed images. As examples, the soil pH may be kept in a specified range, e.g., 6.5 to 7.0, or the chemical content, e.g., phosphorous kept to at least 30 parts per million. When the soil processed images or subsequent testing of areas identified in the soil processed images reveals that the phosphorous levels fall below 30 parts per million, the economic point may be reached at which the land manager decides to have phosphorous fertilizer added, because that should help get more crop back than spent on the phosphorous.

The system 100 may help identify the guidelines that exist for soil pH, for soil phosphorous levels, soil potassium levels, for calcium levels, for sulfur, zinc, boron, manganese, magnesium, iron, and other characteristics. Once the soil type is identified, the system 100 or land manager may identify the natural nitrogen supplying power of the soil too, permitting the land manager to reduce or minimize the amount of nitrogen added. The soil processed images help to give confidence that the soil characteristics are identified properly, so that the soil can be managed effectively at specific areas, leading to better consistency and better land management recommendations to customers.

The soil processed images may help drive seeding. In other words, the system 100 (or land manager) may use the soil processed images to identify soil characteristics, and, for instance, map a particular seed type or genetic crop type to the soil characteristic. For example, the system 100 may determine a certain corn hybrid that has been bred to be a defensive hybrid for certain types of soil in which a more stress resistant genetic is better suited. As another example, the system 100 may determine high yielding genetics for the best soil, where less a resistant genetic is not needed. That is, the system 100 (or land manager) may help allocate the seed types across variability in soil characteristics with much more precision than was previously possible. In that regard, the system 100 may communicate seeding instructions to a remote planting machine. For instance, the remote planting machine may carry, e.g., 10 selectable seed types to choose from. As the planting machine moves down the field, the system 100 may instruct the machine which seed to plant based on the soil characteristic where the planting machine is currently located. As another option, the system 100 may communicate the soil processed data to the seeding machine, and seeding machine may decide based on that data, which seed to plant at any given location in the field.

In other implementations, the system 100 may communicate soil processed data to a third party evaluator, such as an appraiser. The soil characteristics may impact land appraisal or land valuation. In one aspect, the soil characteristics (e.g., soil type) themselves may be indicative of value. In another aspect, the soil processing may help identify how much internal drainage has been installed, and the effect the drainage has had on the field. This information, and other information revealed by the soil processing, may be used by people who are purchasing land or selling land for valuation purposes. The much finer resolution provided by the soil processing (compared to USDA soil data), may drive a more accurate determination of how much of each type of soil is present (or which soil characteristics are present and in what quantities) in the field.

Figure 5:
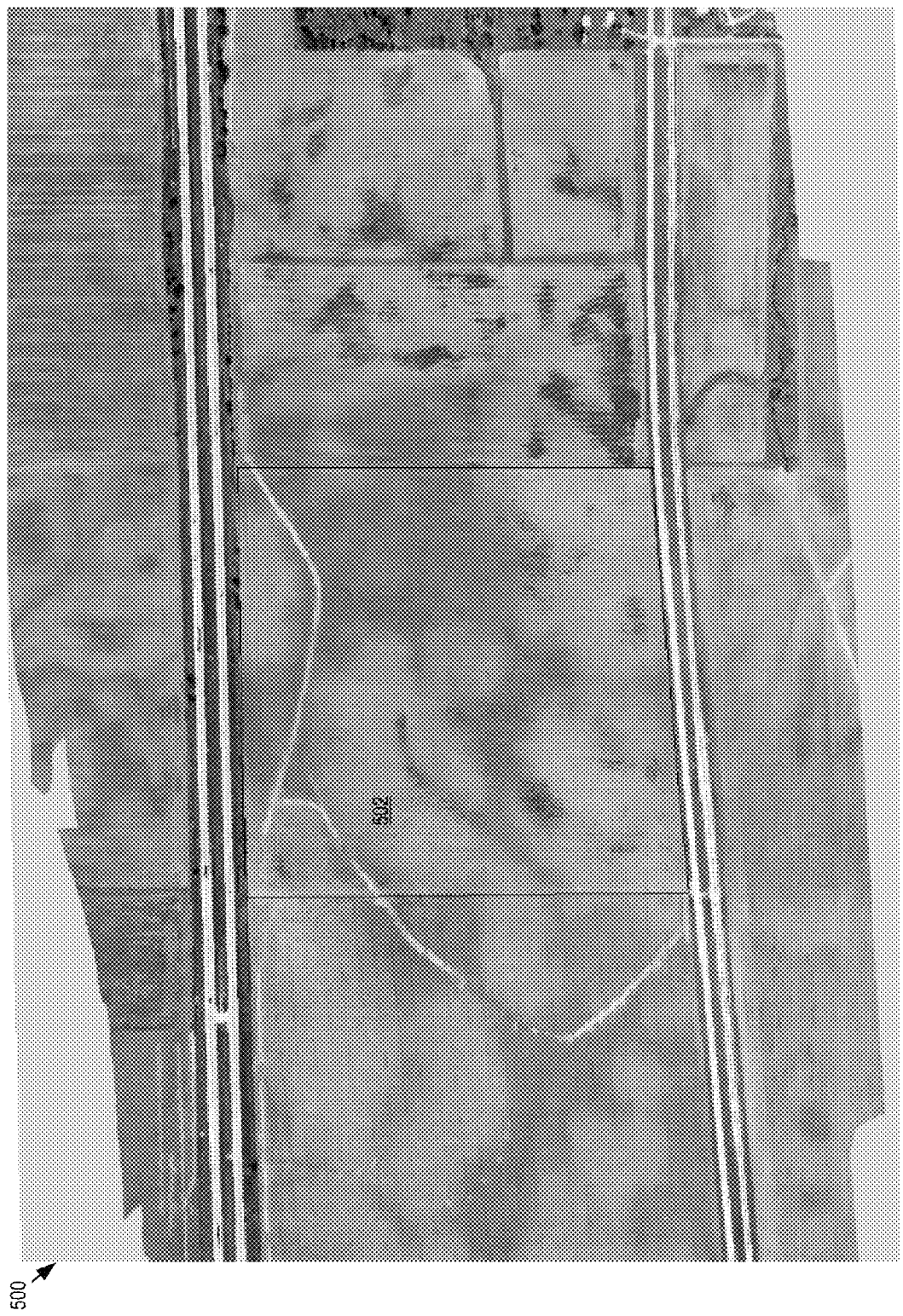
FIG. 5 shows a ground image before clipping.
Figure 7:
FIG. 7 shows a ground image of a field after clipping by the field boundary and after soil processing.
Figure 8:
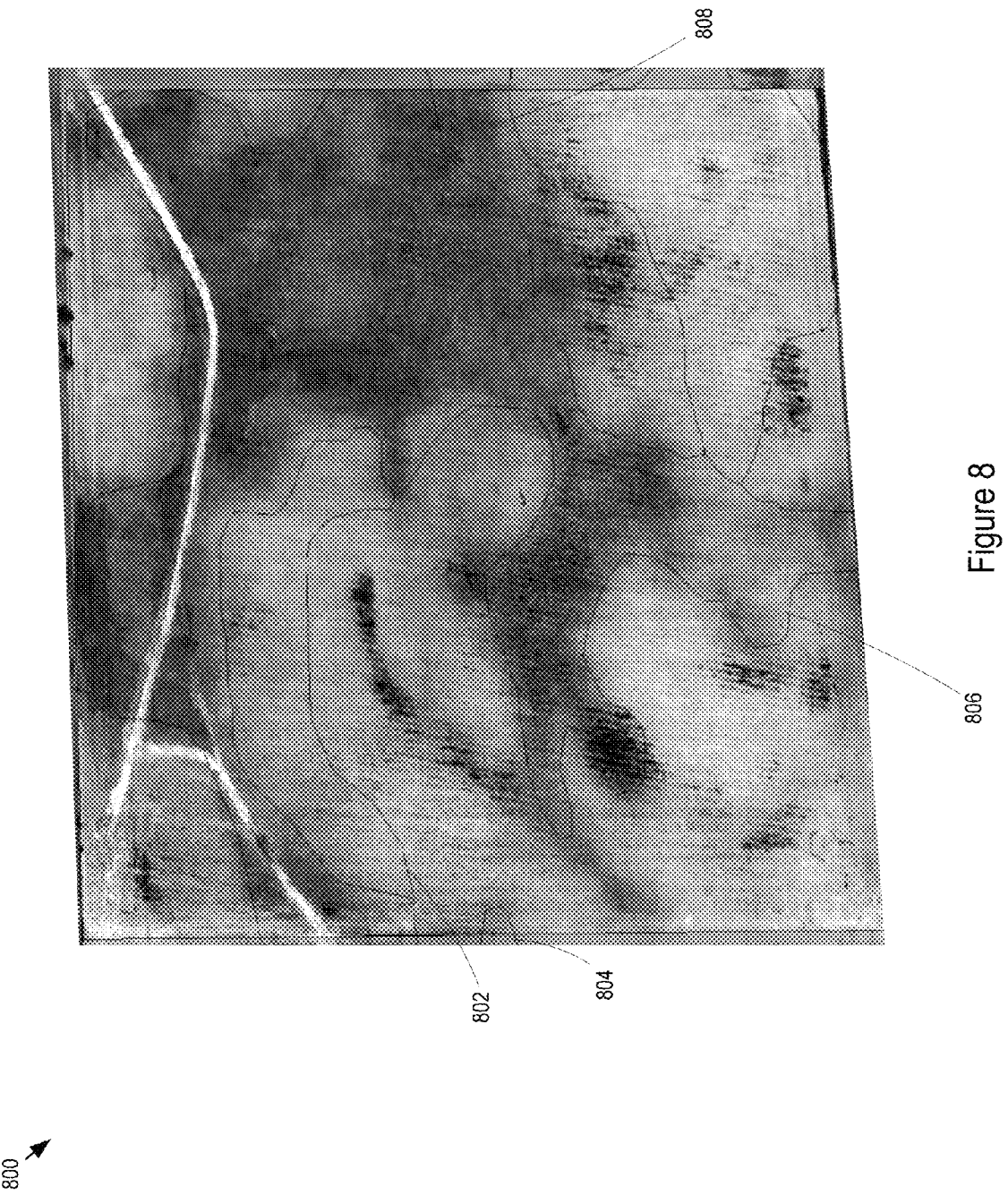
FIG. 8 shows a ground image of a field after soil processing, with soil lines added.

FIG. 5 shows a ground image 500 before clipping (e.g., the output of (202)). The ground image includes a field of interest 502. FIG. 6 shows a field boundary clipping window 600 that will be applied against the field of interest 502 to select the field of interest 502 for soil image processing. FIG. 7 shows a ground image 700 of the field of interest 502 after clipping by the field boundary clipping window 600, and after soil processing by the SMI equation (e.g., the output of 206 and 212). FIG. 8 shows a ground image 800 of a field of interest 502 after soil processing, with soil lines added (e.g., on a layer of the image as the output of (216)). Several of the soil lines are labeled 802, 804, 806, 808.

Figure 9:
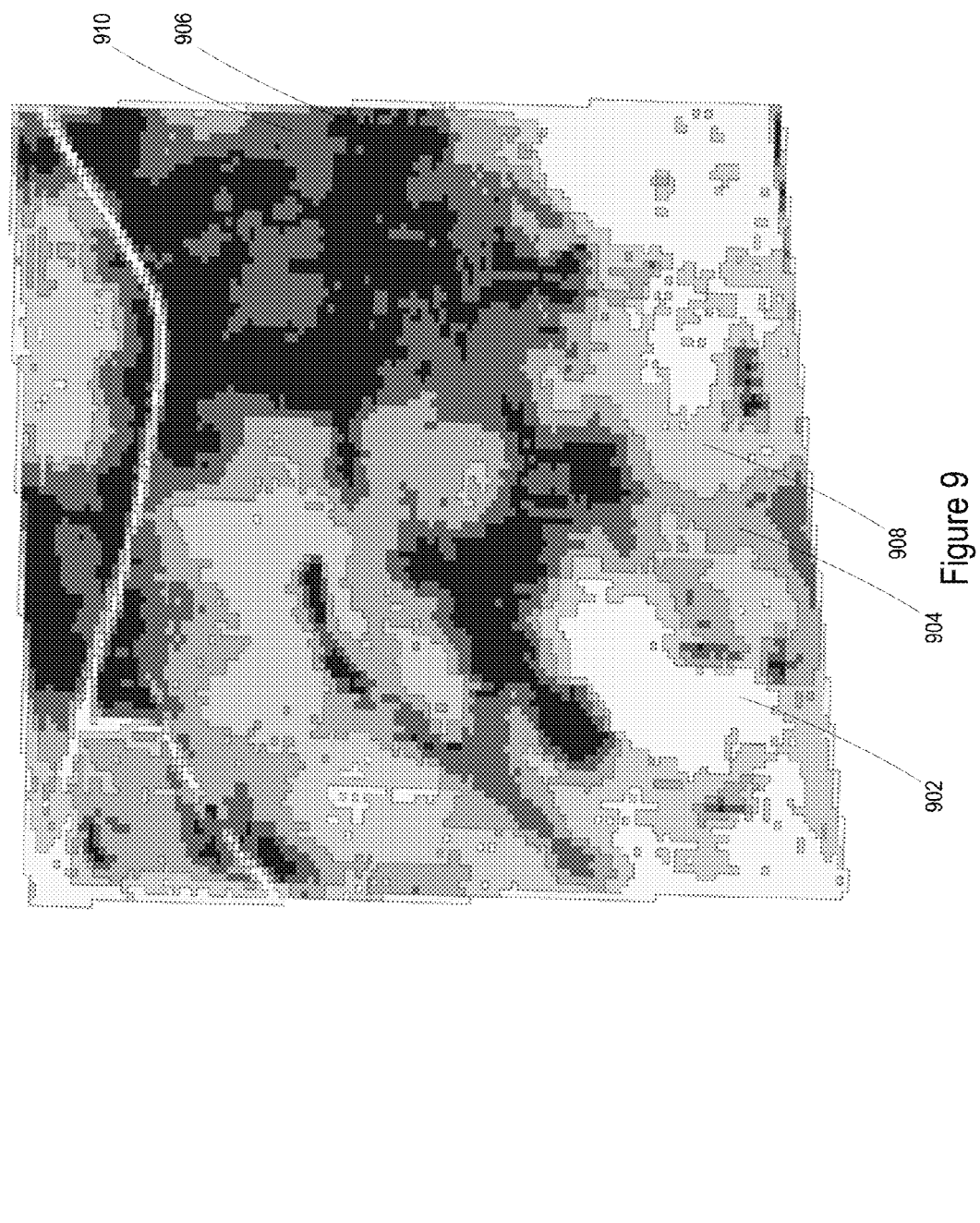
FIG. 9 shows examples of zones.
Figure 10:
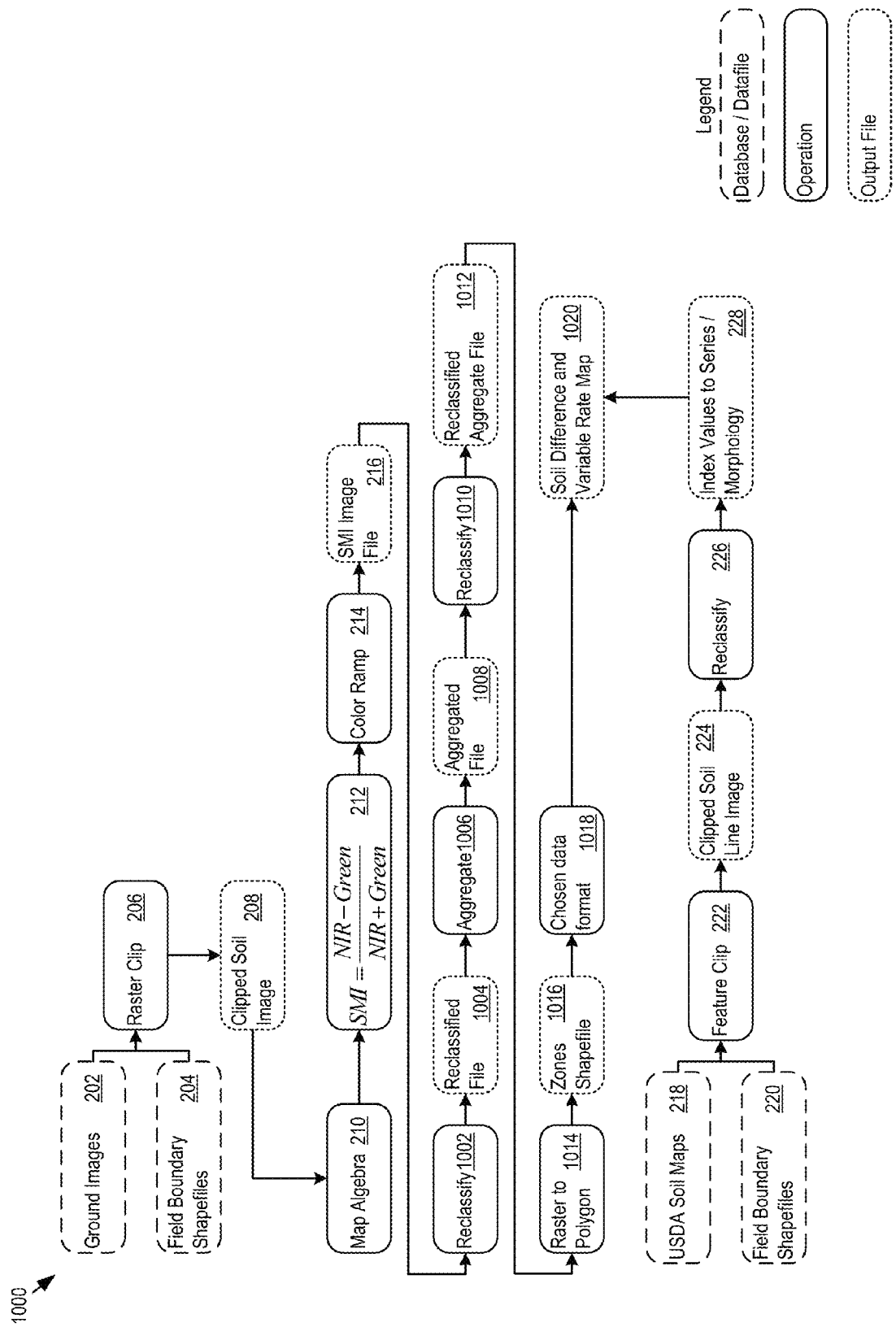
FIG. 10 shows a flow diagram of image processing for generating soil maps with zones and attribute information.

FIG. 10 shows a flow diagram of logic 1000 of image processing for generating soil maps with zones and attribute information. FIG. 10 expands upon features discussed above in FIG. 2. Note the logic 1000 may further separate the soil data into zones, established, for instance, by contour lines. Any of the zones may be considered as a management zone for which particular soil management techniques or recommendations are applied or made. FIG. 9 shows examples of zones 900. For instance, the zone 902 shows a particular management zone, visually distinguished from the management zones 904, 906, 908, and 910 (in this instance by greyscale value). In the example of FIG. 9, the logic 1000 has aggregated the data into 15 ft×15 ft grids of five different types of zones, and added georeference data to the output.

For generating the zones, the logic 1000 may reclassify (1002) the SMI image file (216) to, for instance, adjust a particular data range (e.g., −1 to 1) in the SMI image file (216) to specific zones or ranges, e.g., five zones distinguished by standard deviations or other statistical measures, and produce a reclassified output file (1004). The logic 1000 may further aggregate data (1006) to, for instance, group together blocks of pixels or data points into blocks of specified size (e.g., 15×15 ft, or 6 inches or 6 inches) according, e.g., to a statistical measure such as mode, median, average, or other measure evaluated over the data. An aggregated output file (1008) is the result. The logic 1000 may again reclassify (1010), to, for instance, adjust the particular data range in the aggregated output file (1008) to another range (e.g., the −1 to 1 range originally used in the SMI image file (216) or another range). The reclassified aggregate file (1012) is the result.

The logic 1000 may then execute a raster to polygon conversion (1014). The conversion (1014) may convert, for instance, raster data to vector data. The output may be a shapefile with demarcated zones (1016). The data may, however, be converted to any desired format (1018), e.g., a .shp shapefile format, which may include additional attributes such as the name of the crop field under analysis, georeference data, or other data. Optionally, USDA soil lines may be added to the output of the zone classification processing, to produce a soil difference map (1020) with zone demarcated areas and soil lines.

The logic 1000 may export any of the zones into shape files, PDFs, image files, or any other deliverable form. Any of the processed data, including original soil images, SMI processed images, color ramp processed images, zone demarcated images (e.g., by soil line, color, or greyscale value), or images with USDA soil lines may be used by, or delivered (e.g., over the networks 134) along with GPS or other coordinate or locating data for each management zone, to field scouts (e.g., working with iPads) or field equipment 144 such as planters, combines, liquid applicators, or dry spreaders, to facilitate soil management, land valuation, or other activities or analyses.

Figure 11:
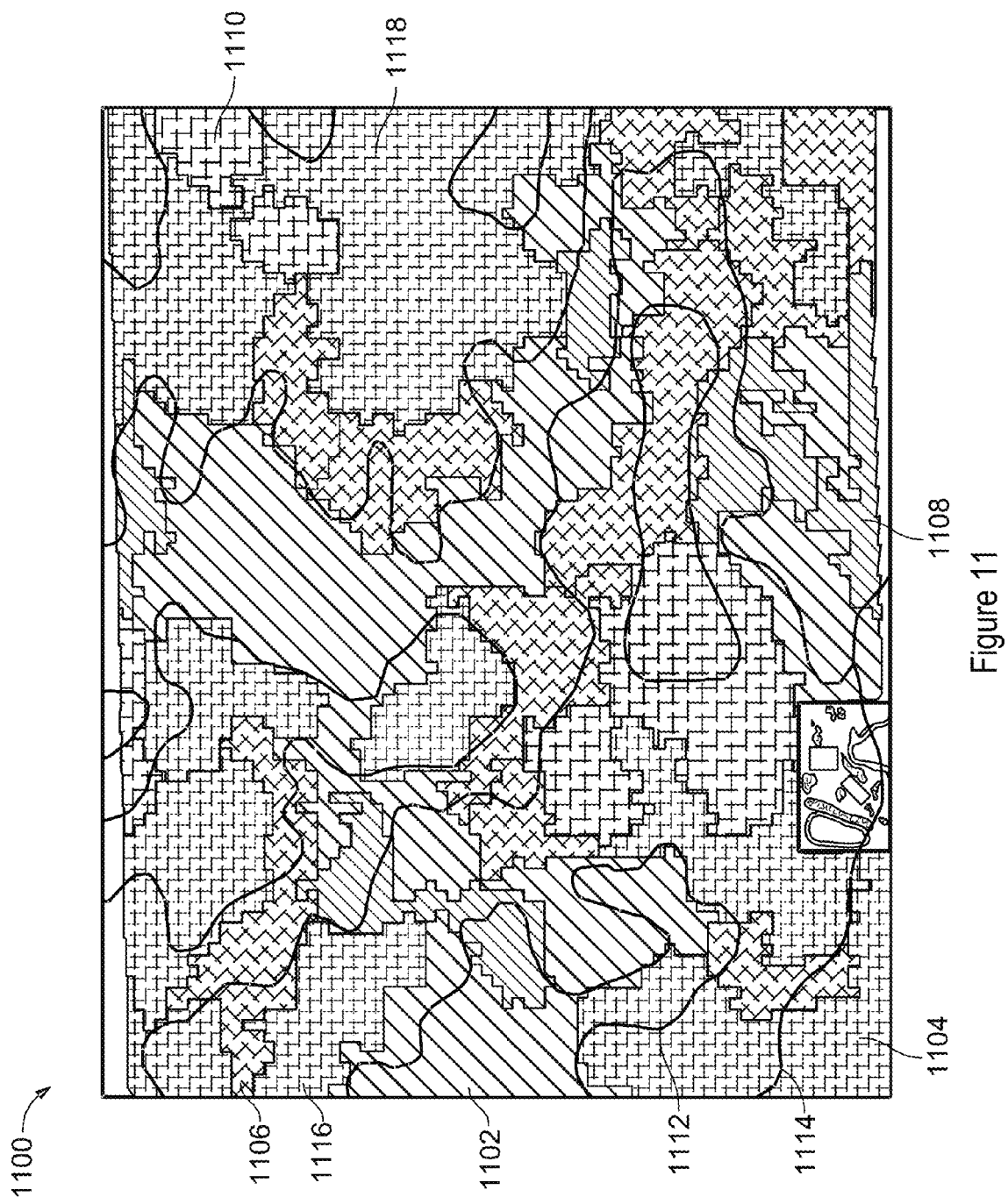
FIG. 11 shows additional examples of management zones identified within a in a field.

Expressed another way, the system 100 may process image data and identify zones of similar soil types. Each zone with a similar soil type may be treated as a management zone for the field. FIG. 11 shows another example of a management zone map 1100. The system 100 created the management zone map 1100 by delineating the management zones according to their type on the region of ground soil that was analyzed using the SMI equation.

In FIG. 11, the system 100 has defined five different types of management zones 1102, 1104, 1106, 1108, and 1110 that occur at multiple locations across the field. There could be any number of types of management zones, however, e.g., 3 types of zones, 5 types of zones, 8 types of zones, a number of zones specified by the owner of the field, or according to a configuration parameter in the system 100, or dynamically chosen according to soil variability across the field. For instance, the management of a highly variable field may benefit from identifying more zones, while the management of a relatively uniform field may proceed with fewer zones. The total number of management zones may be many more than the total number of types of management zones, because the same type of management zone may repeat any number of times across the ground soil that was analyzed.

FIG. 11 also shows the USDA soil lines, e.g., the soil lines 1112 and 1114. Note that the USDA soil lines do not accurately indicate the management zones that are appropriate for the field. However, the system 100, using the image processing techniques described above, determines the variations in soil that map to meaningful management zones for the field.

For the field shown in FIG. 11, the original resolution of the image data was approximately 6 inches×6 inches per pixel. The system 100 created the management zones shown in FIG. 11 at a resolution of approximately 25 ft×25 ft, however, any resolution may be output. The resolution in FIG. 11 therefore corresponds to approximately 50×50 pixels in the original resolution, or 2500 pixels per unit of resolution in FIG. 11. The system 100 may create the units of resolution used for the management zones in many different ways, such as by summing the pixels that are grouped together to form a unit of resolution. In other implementations, the system 100 may average the pixel values from the original resolution image, or apply other functions to the pixels.

The unit of resolution in the management zones need not be square, and they may vary in size and shape across the management zones. As another example, the unit of resolution may be rectangular, e.g., 25 ft×125 ft. The unit of resolution may be chosen based on the expected performance or physical profile of a device used in the field, e.g., to be greater than or equal to the size of a swath of planting laid down by a planter or to be greater than or equal to the extent of material laid down by a fertilizer or device that amends the soil. The field device characteristics may be stored in the system memory 120, and the system 100 may read the characteristics to determine how coarse or fine to make the resolution of the grid for the management zones, e.g., any particular field device may be associated with a resolution recommendation (e.g., 25 ft×100 ft) in the system memory 120.

The system 100 may also provide soil sample markers, e.g., the markers 1116 and 1118. The soil sample markers may indicate where in the field the system recommends that soil samples be taken for analysis. In situations where the management zones indicate transitions between soil types, rather than absolute soil characteristics, the soil samples may facilitate laboratory analysis to precisely determine the chemical content in the soil in the specific management zones.

Figure 13:
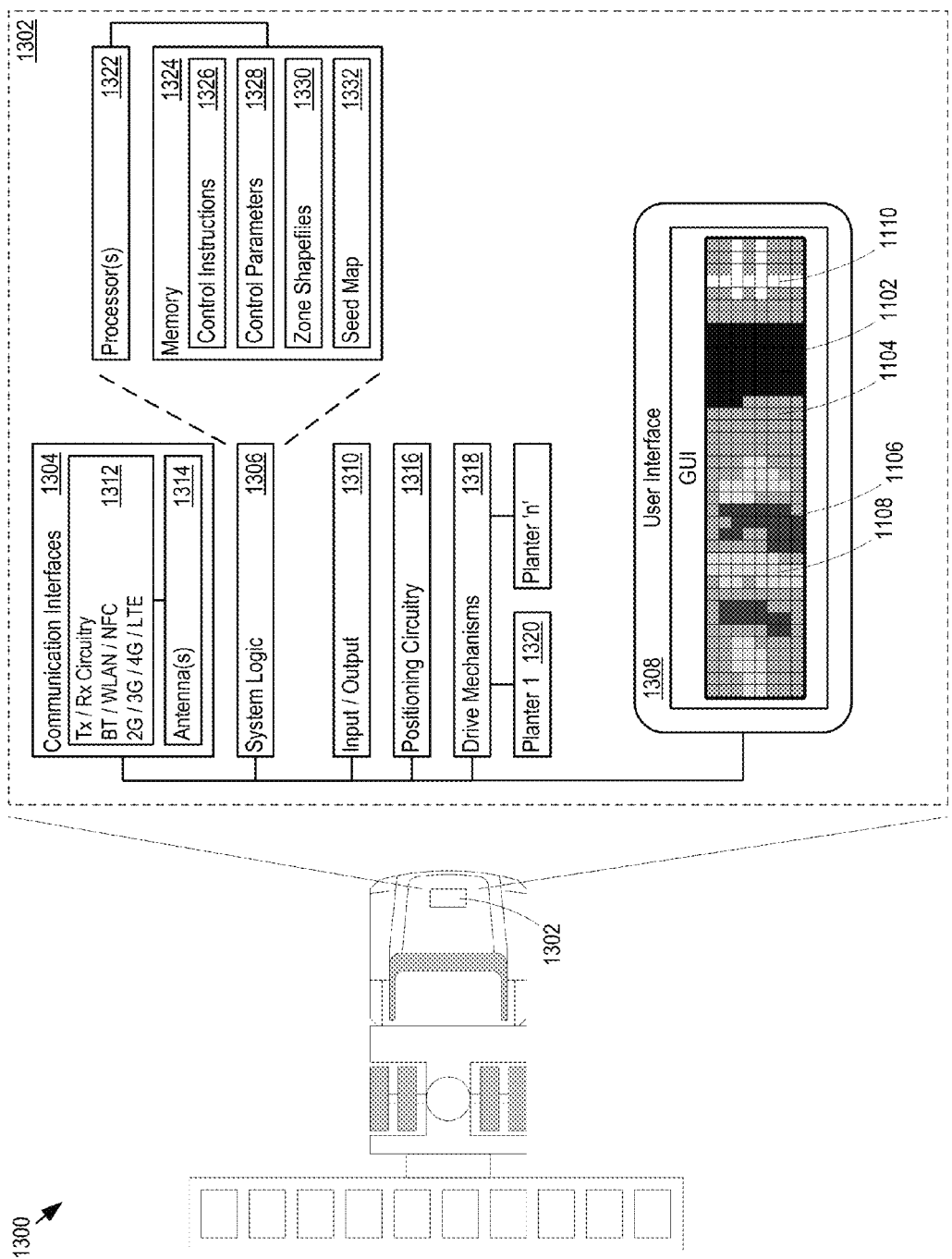
FIG. 13 shows a field device that has stored management zones in its onboard computer system.

The system 100 may transmit a representation of the management zones to other entities, e.g., over the network 134. For instance, the system 100 may transmit shapefiles to field equipment 144, such as a planter, fertilizer, or soil amending device. FIG. 13 shows a specific example of a planter 1300 that receives data from the system 100.

The planter 1300 includes an onboard computer 1302. The onboard computer may take many forms, and in one example includes communication interfaces 1304, system logic 1306, and a user interface 1308. The system logic 1306 may include any combination of hardware, software, firmware, or other circuitry. The user interface 1308 and the input/output interfaces 1310 may include a graphical user interface (GUI), touch sensitive display, voice or facial recognition inputs, buttons, switches, speakers and other user interface elements. Additional examples of the inputs 1310 include microphones, video and still image cameras, headset and microphone input/output jacks, Universal Serial Bus (USB) connectors, memory card slots, and other types of inputs. The input/output interfaces 1310 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces. Accordingly, the planter 1300 may receive data from the system 100 either wirelessly, or via media (e.g., CD or flash drive) inserted into the input/output interfaces 1310.

In the communication interfaces 1304, Radio Frequency (RF) transmit (Tx) and receive (Rx) circuitry 1312 handles transmission and reception of signals through one or more antennas 1314. The communication interface 1304 may include one or more transceivers. The transceivers may be wireless transceivers for transmitting and receiving through one or more antennas, or (for some devices) through a physical (e.g., wireline) medium such as coaxial cable, Ethernet cable, or a telephone line.

The planter 1300 also includes positioning circuitry 1316. For instance, the positioning circuitry may be a satellite positioning system, such as the Global Positioning System (GPS) used in the United States, or other satellite positioning systems used in other parts of the world. The positioning circuitry 1316 ascertains a location for the planter 1300 with respect to the field and with respect to management zones defined within the field. The system logic 1306 may then control the drive mechanisms 1318 (e.g., hydraulic drives) to adjust the rate of planting by the various individual planter mechanisms 1320.

In that regard, the system logic 1306 is part of the implementation of any desired functionality in the planter 1300, such variable rate seed planting. The system logic 1306 may include one or more processors 1322 and memories 1324. The memory 1324 stores, for example, control instructions 1326 that the processor 1322 executes to carry out desired functionality for the planter 1300, such as planting seeds at a variable rate according to the management zones. The control parameters 1328 provide and specify configuration and operating options for the control instructions 1326.

In particular, the memory 1324 may store the shapefiles 1330 that define the management zones. As previously noted, the planter 1300 may be equipped with a GPS receiver to facilitate automated operation according to their location in the field with respect to the management zones read from memory by the processors in the onboard computer, e.g., by planting a variable number of seeds depending on the zone, or laying down soil amending chemicals depending on the zone and using, for instance, variable rate applicators. Thus, for instance, the planter 1300 may respond to the management zones by planting more seeds in zones that are expected to have higher productivity, and plant fewer seeds in zones that are expected to have lower productivity.

Figure 12:
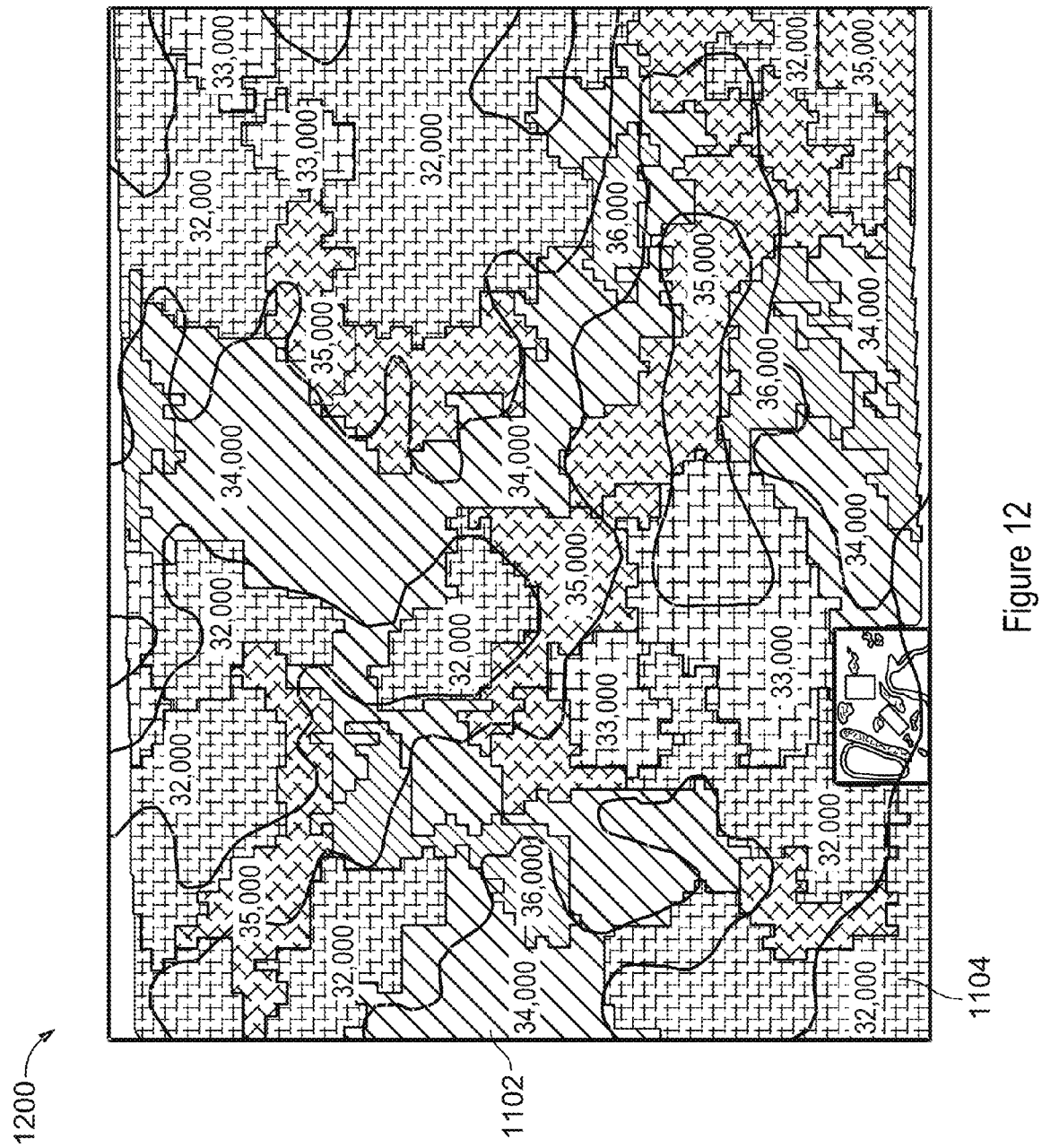
FIG. 12 shows a variable rate seed map based on management zones identified in a field.

FIG. 12 shows a variable rate seed map 1200 based on the management zones identified in the field shown in FIG. 11. The seed map 1200 may be established or generated within the system 100, and provides a seeding recommendation for the field based on the management zones determined by the processing described above. The system 100 may automatically assign seeding recommendations based on a table of pre-defined management zones for specific crops, or may accept operator input to specify seeding recommendations, or both. As specific examples, in FIG. 12 the seed map 1200 recommends 32,000 corn seeds per acre for the management zone 1104, and 34,000 seeds per acre for the management zone 1102. The system 100 may also transmit the seed map to other entities, e.g., to the planter 1300, which stores the seed map in the memory 1324 as the seed map 1332, for the planter's use in automatically adjusting the drive mechanisms 1318 in the planter to accommodate the recommended number of seeds per acre per management zone, e.g., in connection with GPS determined location of the planter in comparison to the management zones.

Figure 14:
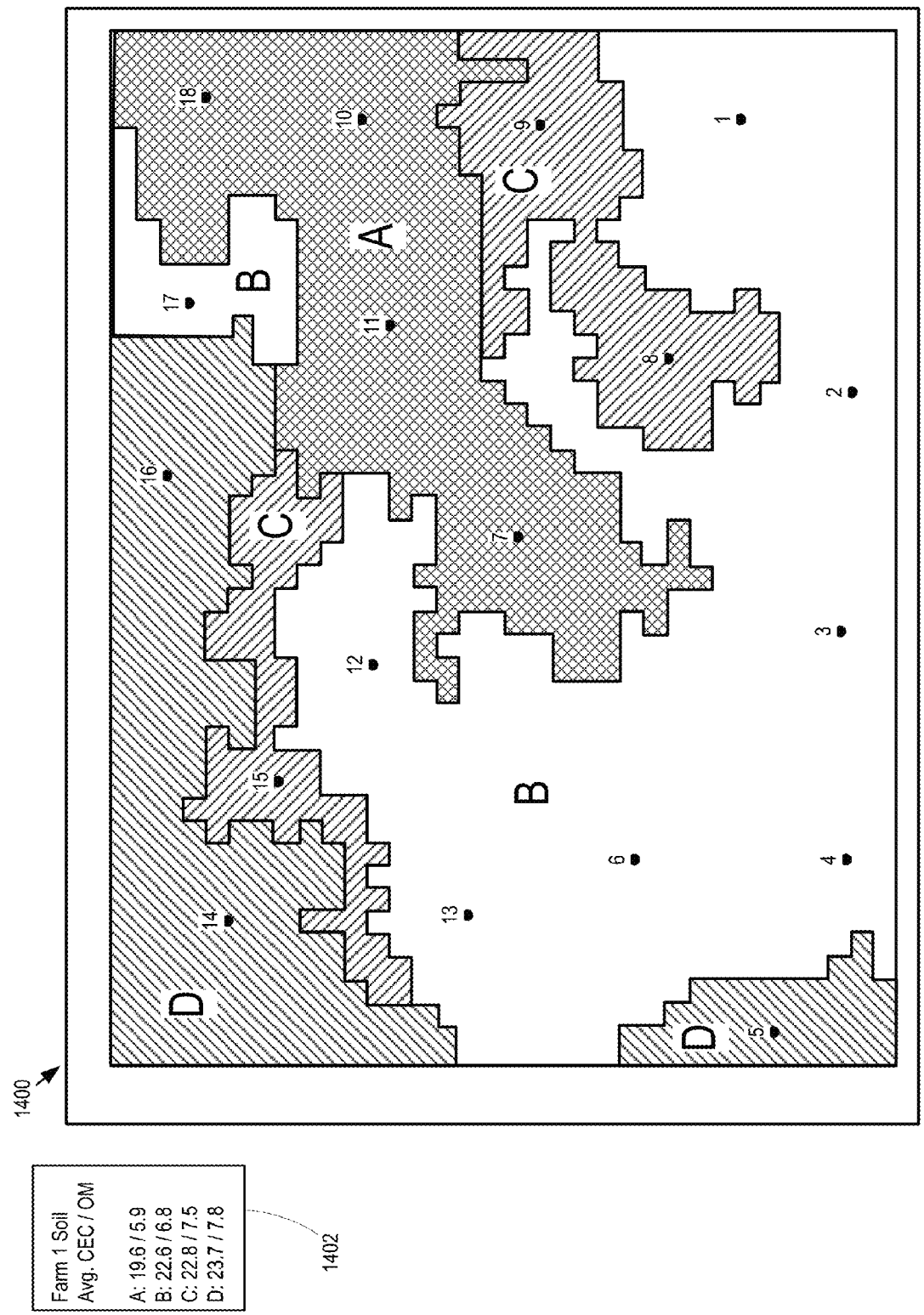
FIG. 14 shows an example of zones identified in a field, delineated according to CEC/OM.

FIG. 14 shows an example of management zones identified in a field 1400, delineated according to soil characteristics, and showing the accuracy of the determined soil characteristics with respect to measured cation-exchange-capacity (CEC)/Organic Material (OM). As described above, the system 100 has mapped the soil to a set of management zones, the number and resolution of which may be pre-defined and configurable within the system 100. Specifically, in FIG. 14, there are four management zones, labeled in FIG. 14 as Zone A, Zone B, Zone C, and Zone D.

Given the system-determined management zones, the measurements 1402 show within each zone the measured average CEC/OM. The measurements 1402 are reproduced below in Table 1:

TABLE 1

| Farm 1 Soil | | |
|---|---|---|
| Zone | Average CEC | Average OM |
| A | 19.6 | 5.9 |
| B | 22.6 | 6.8 |
| C | 22.8 | 7.5 |
| D | 23.7 | 7.8 |

FIG. 14 shows measurement points 1 through 16. The measurement points were selected based on the delineation of management zones by the system 100, representing a significant improvement over a rigid grid method. The samples were collected by taking probes (e.g., 10 probes) in a circle around the sample point in a 50-100 foot radius. The probe samples were collected and combined using a collection device and transferred to a sample bag. The sample bags are labeled with field and sample point number and then sent to a soil testing laboratory as a field group, e.g., Midwest laboratories in Omaha, Nebr. Table 1 shows example results of the testing, and in particular, how well the system identified zones help to identify regions of differing soil characteristics.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a memory comprising:
source image data comprising a region of ground soil to analyze, the source image data comprising near infrared (NIR) spectral data and Green spectral data;
image processing instructions configured to process the NIR spectral data and the Green spectral data according to an SMI function:

$$SMI = \frac{NIR - \text{Green}}{NIR + \text{Green}};$$

processing logic in communication with the memory, the processing logic configured to:
transform the source image data into a soil processed image by executing the image processing instructions on the source image data;
store the soil processed image in the memory; and
delineate the soil processed image into discrete management zones, each management zone corresponding to a distinction in soil type indicated in the soil processed image after application of the SMI function.

2. The system of claim 1, where the processing logic is further configured to:
assign a management action to at least some of the management zones.

3. The system of claim 2, where the management action comprises:
a recommended number of seeds per acre.

4. The system of claim 2, where the management action comprises:
a soil amendment recommendation.

5. The system of claim 2, where the management action comprises:
a fertilization recommendation.

6. The system of claim 2, further comprising a communication interface in communication with the processing logic and the memory, the processing logic further configured to:
establish a communication link with a field device that will operate over the ground soil;
communicate the management zones to the field device; and
communicate the management actions for the management zones to the field device.

7. The system of claim 1, further comprising a communication interface in communication with the processing logic and the memory, the processing logic further configured to:
establish a communication link with a field device that will operate over the ground soil; and
communicate the management zones to the field device.

8. The system of claim 1, where the management zones delineate differences in soil characteristics across the soil processed image.

9. The system of claim 8, further comprising:
reading from the memory a configuration parameter that specifies how many distinct types of management zones to create; and
delineating the soil processed image into a number of management zones types according to the configuration parameter.

10. The system of claim 1, where the processing logic is further configured to:
perform a clipping operation on the source image data to limit the source image data to a specific region.

11. The system of claim 10, where the clipping operation is configured to limit the source image data to a specific crop field.

12. The system of claim 1, where the processing logic is further configured to:
specify soil testing locations within at least some of the management zones;
establish a communication link with an external entity;
communicate the management zones to the external entity; and
communicate the soil testing locations for the management zones to the external entity.

13. The system of claim 1, where the processing logic is further configured to:
create the management zones on a coarser resolution grid than the soil processed image.

14. The system of claim 13, where the processing logic is further configured to:
read a field device characteristic that determines a grid resolution for the management zones; and
create the management zones on a coarser resolution grid than the soil processed image according to the grid resolution.

15. A method comprising:
obtaining source image data comprising a region of ground soil to analyze, the source image data comprising near infrared (NIR) spectral data and Green spectral data;
transforming the source image data into a soil modified index representation, by applying an SMI function:

$$SMI = \frac{NIR - \text{Green}}{NIR + \text{Green}};$$

to the NIR spectral data and the Green spectral data;
determining, within the soil modified index representation, differences in soil type;
assigning the differences in soil type to a pre-determined number of types of management zones; and
creating a management zone map by delineating the management zones according to their type on the region of ground soil.

16. The method of claim 15, further comprising:
identifying, within the source image data, a particular crop field to analyze among other terrain; and
clipping the particular crop field so that transforming the source image data operates on the particular crop field but not the other terrain.

17. The method of claim 15, further comprising:
establishing a communication link with a field device that will operate over the ground soil; and
communicating the management zones to the field device.

18. The method of claim 17, further comprising:
assigning a management action to at least one of the management zones; and
communicating the management action for the management zone to the field device.

19. A system comprising:
a memory comprising:
source image data comprising a region of ground soil to analyze, the source image data comprising near infrared (NIR) spectral data and Green spectral data;
image processing instructions configured to process the NIR spectral data and the Green spectral data according to an SMI function:

$$SMI = \frac{NIR - \text{Green}}{NIR + \text{Green}};$$

processing logic in communication with the memory, the processing logic configured to:
identify, within the source image data, a particular crop field to analyze among other terrain;
clip the particular crop field from the source image data;
execute the image processing instructions on the particular crop field, but not the other terrain, to generate a soil processed image for the particular crop field;
store the soil processed image in the memory;
determine a number of types of management zones to identify in the particular crop field;
identify, responsive to executing the image processing instructions, differentiations in soil type in the particular crop field;
assign the differentiations in soil type to the number of types of management zones; and
create a management zone map comprising delineations of the particular crop field into discrete management zones.

20. The system of claim 19, where the processing logic is further configured to:
assign a management action to at least one of the management zones;
establish a communication link with an external device;
communicate the management zones to the external device; and
communicate the management action for the management zones to the external device.

* * * * *